(12) United States Patent
Sun et al.

(10) Patent No.: US 10,500,637 B2
(45) Date of Patent: Dec. 10, 2019

(54) SILVER-CHROMIUM ALLOY NANOWIRE AND PREPARATION METHOD THEREFOR

(71) Applicant: BEIJING UNIVERSITY OF CHEMICAL TECHNOLOGY, Beijing (CN)

(72) Inventors: Xiaoming Sun, Beijing (CN); Cheng Wang, Beijing (CN)

(73) Assignee: BEIJING UNIVERSITY OF CHEMICAL TECHNOLOGY, Beijing (CN)

( * ) Notice: Subject to any disclaimer, the term of this patent is extended or adjusted under 35 U.S.C. 154(b) by 0 days.

(21) Appl. No.: 15/571,852

(22) PCT Filed: Jun. 4, 2015

(86) PCT No.: PCT/CN2015/080785
§ 371 (c)(1),
(2) Date: Nov. 6, 2017

(87) PCT Pub. No.: WO2016/187896
PCT Pub. Date: Dec. 1, 2016

(65) Prior Publication Data
US 2018/0141116 A1 May 24, 2018

(30) Foreign Application Priority Data
May 28, 2015 (CN) .......................... 2015 1 0282845

(51) Int. Cl.
*B22F 1/00* (2006.01)
*B22F 9/24* (2006.01)
*B82Y 30/00* (2011.01)

(52) U.S. Cl.
CPC .................. *B22F 1/00* (2013.01); *B22F 9/24* (2013.01); *B82Y 30/00* (2013.01)

(58) Field of Classification Search
CPC ............................... B22F 1/0025; B82Y 30/00
(Continued)

(56) References Cited

U.S. PATENT DOCUMENTS

| | | | |
|---|---|---|---|
| 2008/0054875 A1 | 3/2008 | Saito | |
| 2010/0034693 A1* | 2/2010 | Li | B22F 1/0018 420/501 |

(Continued)

FOREIGN PATENT DOCUMENTS

| | | |
|---|---|---|
| CN | 1734733 A | 2/2006 |
| CN | 101563801 A | 10/2009 |

(Continued)

OTHER PUBLICATIONS

Yunxia Ran, et al., A one-step route to Ag nanowires with a diameter below 40 nm and an aspect ratio above 1000. The Royal Society of Chemistry 2014, 50, 14877-14680.

*Primary Examiner* — Matthew D Matzek
(74) *Attorney, Agent, or Firm* — Gokalp Bayramoglu

(57) ABSTRACT

The invention discloses a silver-chromium alloy nanowire having a diameter of 18 to 60 nm, a length of 5 to 100 μm, wherein a molar ratio of the silver to chromium is 1:0.01-3. The preparation method of the silver-chromium alloy nanowire comprises the steps of: a. preparing a reaction solution: formulating a silver source, a chromium source, polyvinylpyrrolidone and a reductive agent into a reaction solution, or adding the materials into deionized water to formulate a reaction solution; and b. performing a reductive reaction: performing a reductive reaction by maintaining the reaction vessel at a temperature of 120° C. to 200° C. for 2-10 hours to obtain a silver-chromium alloy nanowire suspension. The minimum diameter of the silver-chromium (Continued)

alloy nanowire of the present invention may reach 18 nm and its length is usually 20 μm or above. Thus, it has a broad application prospect.

9 Claims, 9 Drawing Sheets

(58) Field of Classification Search
USPC .......... 977/762; 75/371, 741; 420/428, 501;
428/357, 364, 402, 544, 615, 655, 666,
428/668, 673
See application file for complete search history.

(56) References Cited

U.S. PATENT DOCUMENTS

2012/0148436 A1*  6/2012  Whitcomb ............ B22F 1/0025
420/416
2014/0224321 A1     8/2014  Lim

FOREIGN PATENT DOCUMENTS

| | | |
|---|---|---|
| CN | 101814541 A | 8/2010 |
| CN | 102328095 A | 1/2012 |
| CN | 103100724 A | 5/2013 |
| CN | 103338883 A | 10/2013 |
| CN | 103357889 A | 10/2013 |
| CN | 103537710 A | 1/2014 |
| CN | 104505149 A | 4/2015 |
| KR | 20060132076 A | 12/2006 |
| KR | 101352106 B1 | 1/2014 |
| WO | WO2014114828 A1 | 7/2014 |

* cited by examiner

SILVER-CHROMIUM ALLOY NANOWIRE AND PREPARATION METHOD THEREFOR

CROSS REFERENCE TO RELATED APPLICATIONS

This application is the national phase entry of International Application No. PCT/CN2015/080785, filed on Jun. 4, 2015, which is based upon and claims priority to Chinese Patent Application No. CN2015102828459, filed on May 28, 2015, the entire contents of which are incorporated herein by reference.

TECHNICAL FIELD

The invention is in the advanced inorganic nanomaterial field, and particularly, the invention relates to a silver-chromium alloy nanowire and preparation method therefor.

BACKGROUND OF THE INVENTION

A transparent conductive film is a film that is not only able to conduct electricity but also has a high transparency in the wavelength range of visible light. A common material of the transparent conductive film is tin-doped Indium oxide (ITO). The material can be widely used because it only absorbs ultraviolet light, but not absorb visible light due to its broad forbidden band width, and it has a good conductivity. The indium is present in lithosphere in a low quantity and in a wide dispersion form. Currently, no indium-rich ore is found, and indium is only present in zinc ores or other metal ores as impurity. Thus, indium is contemplated as a rare metal. With the progress in science and technology, the transparent conductive film will be widely used as electrode materials in electroluminescence devices, plant liquid crystal display devices and electrochromic display devices. However, indium, as a rare metal, has a limited total available quantity, and thus finding of a novel material of the transparent conductive film that can be used for replacing ITO would have important economic values.

Silver nanowires, in addition to excellent conductivity, ductility and tensile performance as possessed by conventional silver materials, have electrical and optical characteristics different from those of bulk silver materials due to unique dimension and morphological characteristics in nanometer size, and thus the silver nanowires can be used as the primary raw material in a novel transparent conductive film.

Materials for the transparent conductive film require a good conductivity, a high transparency and a low haze. The haze is used to show cloud-like or cloudy appearance of the interior or surface of a transparent or semi-transparent material as caused due to light diffusion, and the haze is relative to the roughness of the surface of the material. Silver nanowires as prepared by conventional methods have a diameter of about 60 nm, and a length between 2 and 100 Transparent conductive films as prepared with such silver nanowires can have a good conductivity and a high transparency, whereas the haze is very high, essentially being about 2.3%. Furthermore, the transparent conductive films highly require the haze, and in the display field, the haze of the transparent conductive films is required to be close to 1%. However, silver nanowires as prepared according to conventional methods can hardly satisfy the requirement.

Journal Paper A: one-step route to Ag nanowires with a diameter below 40 nm and an aspect ratio above 1000, DOI: 10.1039/C4cc04698f discloses a method for preparing silver nanowires, in which the prepared nanowires have a diameter of 30 nm or above. However, the inventor prepares a transparent conductive film with the silver nanowires on the basis of repeating the above experimental results to find out that the haze of the transparent conductive film is about 1.6%. As for applications of the silver nanowires in the display field, the haze is still overly high, and thus if using the material as prepared according to the method in the preparation of a transparent conductive film, the material hardly satisfies associated application standards.

In order to overcome the defect with regard to the high haze of current silver nanowires when being used for preparation of transparent conductive films, the intention provides a silver-chromium alloy nanowire and a method for preparation thereof. The silver-chromium alloy nanowires according to the invention have a lower diameter to be 18 nm. Thus, the silver-chromium alloy nanowires can be used as a raw material for preparing a transparent conductive film in replace of silver nanowires. Moreover, the nanowires can reduce the amount of silver and preparation costs and achieve a low haze.

SUMMARY OF THE INVENTION

The objective of the invention is to provide a silver-chromium alloy nanowire and a method for preparation thereof.

The objective of the invention is achieved by the following technical solution:

A first aspect of the invention relates to a silver-chromium alloy nanowire, having a diameter of 18 to 60 nm and a length of 5 to 100 μm, in which the silver to chromium molar ratio is 1:(0.01-3).

A second aspect of the invention relates to a method for preparing the silver-chromium alloy nanowire according to the first aspect, comprising the following steps:

a. preparing a reaction solution: a silver source, a chromium source, polyvinylpyrrolidone and a reductive agent are formulated into a reaction solution, or the above materials are added to deionized water to formulate a reaction solution, wherein the molar ratio of the silver ions in the silver source to the chromium ions in the chromium source is 1:(0.01-3); any of the above-mentioned reaction solutions is added into a reaction vessel;

b. performing a reductive reaction: the reaction vessel is placed at a temperature of 120° C. to 200° C. to perform a reductive reaction for 2 to 10 hours, to provide a silver-chromium alloy nanowire suspension.

In the method, the reaction vessel is either closed (e.g., a closed reactor) or opening (e.g., a conical flask), and in the reduction reaction stage, the reactor, according to its type, can be placed in an oven or in an oil bath to assure the reaction temperature.

In a preferred embodiment, after the step b, the method further comprises the step c: centrifugal concentrating the above silver-chromium alloy nanowire suspension to provide a concentrated silver-chromium alloy nanowire suspension.

In a preferred embodiment, the reductive agent may be a polyol, formamide, hexamethylenetetraamine or glucose. Independently, the polyol may be ethylene glycol, 1,2-propanediol, 1,4-butanediol or hexanediol.

In a preferred embodiment, the silver source is silver nitrate, silver oxalate or silver acetate; independently, the chromium source may be chromium sulfate, chromium chloride or chromium nitrate.

In a preferred embodiment, the reaction solution further comprises a nucleation controlling agent, and the nucleation controlling agent may be selected from the group consisting of alkali metal halides or alkaline earth metal halides, alkali metal silicates or alkaline earth metal silicates, alkali metal sulfates or alkaline earth metal sulfates, alkali metal thiocyanates or alkaline earth metal thiocyanates, alkali metal oxalates or alkaline earth metal oxalates, and alkali metal sulfides or alkaline earth metal sulfides.

In a preferred embodiment, the reductive reaction is performed under autogenous pressure in a closed reaction vessel; alternatively, the reductive reaction is performed under normal pressure in an opening reaction vessel.

In a preferred embodiment, the reaction solution is added into the closed reaction vessel or the opening reaction vessel at once; alternatively, a portion of the reaction solution is added to the opening reaction vessel, and then the left portion of the reaction solution is added to the opening reaction vessel in portions during the reaction. When the reaction solution is added to the reaction vessel at once, the nucleation and growth of the silver-chromium alloy crystals are completed in one step; when a portion of the reaction solution is added to the reaction vessel, and then the left portion of the reaction solution is added to the reaction vessel in portions during the reaction, the formation of the silver-chromium alloy nanowires substantially includes the nucleation and then the growth.

In a preferred embodiment, when the reductive agent is a polyol, the volume ratio of the polyol to deionized water is 1:(0-10); when the reductive agent is formamide or glucose, the molar ratio of the silver ions in the silver source to the reductive agent is 1:(2.7-20), and the molar ratio of the chromium ions in the chromium source to the reductive agent is 1:(3-30); when the reducing agent is hexamethylenetetraamine, the molar ratio of the silver ions in the silver source to the reductive agent is 1:(0.7-5), and the molar ratio of the chromium ions in the chromium source to the reductive agent is 1:(0.8-8).

In a preferred embodiment, the preparing method reduces the diameter of the prepared silver-chromium alloy nanowires by reducing the Ag/Cr molar ratio. Regarding the silver-chromium alloy nanowires as prepared according to the method of the invention, its diameter can be independently adjusted by adjusting the silver to chromium molar ratio, and in the case of the optimum ratio, the diameter of the silver-chromium alloy nanowires may be minimized to be 18 nm.

A third aspect of the invention relates to the use of the silver-chromium alloy nanowires according to the first aspect of the invention for preparing a transparent conductive film.

The preparation method according to the invention specifically comprises the following steps: first of all, a reaction solution is prepared by formulating a silver source, a chromium source, polyvinylpyrrolidone and a reductive agent or by adding the above materials to deionized water under room temperature; thereafter, the above reaction solution is added to a reaction vessel and in the reaction vessel, the solution is violently stirred to form a uniform solution; after the solution is homogenously dispersed, the mechanical stirring device or the magnetic stirrer is taken out; further, the reaction vessel is placed in an oven or an oil bath vessel, and at a temperature of 120° C. to 200° C. and under normal pressure, the reaction is preformed and continues for 2 to 10 hours to produce a silver-chromium alloy nanowire suspension; after the reaction is completed, the reaction vessel is taken out of the oven or the oil bath vessel and then is cooled to room temperature; thereafter, if necessary, the above silver-chromium alloy nanowires suspension may be centrifugal concentrated to provide a concentrated silver-chromium alloy nanowire suspension. For example, the centrifugal concentration includes dissolving the silver-chromium alloy nanowire suspension in ethanol, and centrifugal concentrating the suspension several times to produce a concentrated silver-chromium alloy nanowire suspension, for example, the centrifugal concentration is performed twice with the rotary speed of 3000 rpm to 8000 rpm and each centrifugal concentration is conducted for 20 min. One skilled in the art can select specific process conditions of the centrifugal concentration according to actual situations.

In the invention, polyvinylpyrrolidone is used as a protective agent. When a reductive agent is mixed with the silver source, the reductive agent can reduce the silver ions in the silver source and the chromium ions in the chromium source at a suitable temperature.

As compared with the prior art, the present invention can achieve the following advantageous effects:

1. The silver-chromium alloy nanowires according to the invention not only are not reported, but also have excellent properties. The diameter of the nanowires according to the invention may be minimized to be 18 nm, and the length usually is 20 μm or above. The transparent conductive film as prepared by the silver-chromium alloy nanowires according to the invention may have a minimum haze of 1%, a square resistance of (60±5) Ω/sq, and a light transmission rate of 90%, and thus the film can be applied in displays and other fields that highly require properties of materials.

2. The silver-chromium alloy nanowires as prepared by the method according to the invention have an independently adjustable diameter, and the diameter may be adjusted by adjusting the silver to chromium ratio. With the increase in the chromium content, the diameter of the silver-chromium alloy nanowires may be minimized to be 18 nm.

3. As compared to the preparation of silver nanowires, during the preparation of the silver-chromium alloy nanowires according to the invention, the addition of the chromium can allow the silver-chromium alloy nanowires as prepared by the method according to the invention to have a high line-forming rate and a low particle content.

DETAILED DESCRIPTION OF THE INVENTION

The following text further describes the invention by combining the drawings and the examples. However, it should be understood that the following specific examples are only used for illustrating the invention, but not limiting the invention in any form.

Example 1

Figure 1:
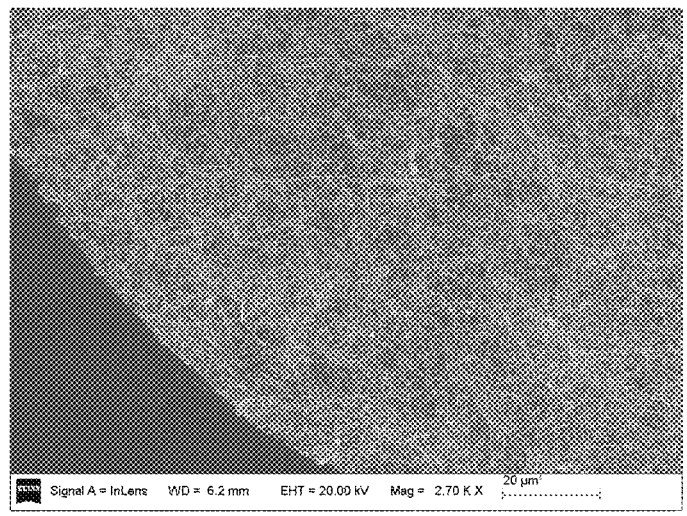
FIG. 1 is a diagram for low magnification scanning electron microscope (SEM) of the silver-chromium alloy nanowires with the silver to chromium molar ratio of 1:0.1, in which the silver-chromium alloy nanowires have a length of about (100±10) and a diameter of about (60±5) nm.
Figure 2:
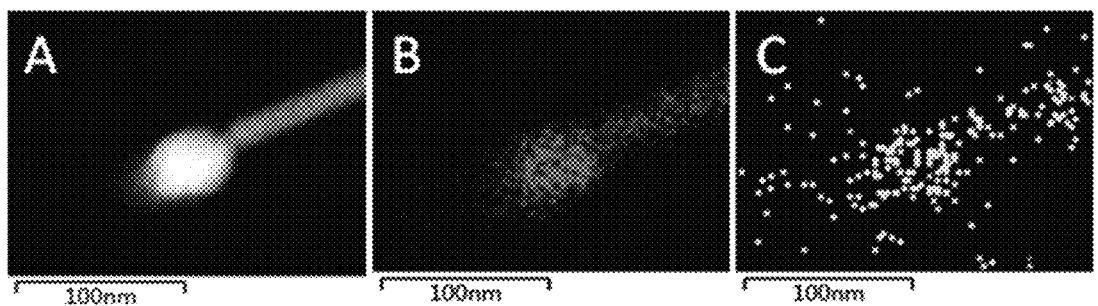
FIG. 2A is a diagram for high magnification transmission electron microscope (TEM) of a single silver-chromium alloy nanowire.
FIG. 2B and FIG. 2C are diagrams of the element distribution of silver and chromium in the silver-chromium alloy nanowires respectively, with the silver to chromium molar ratio of 1:0.1.
Figure 3:
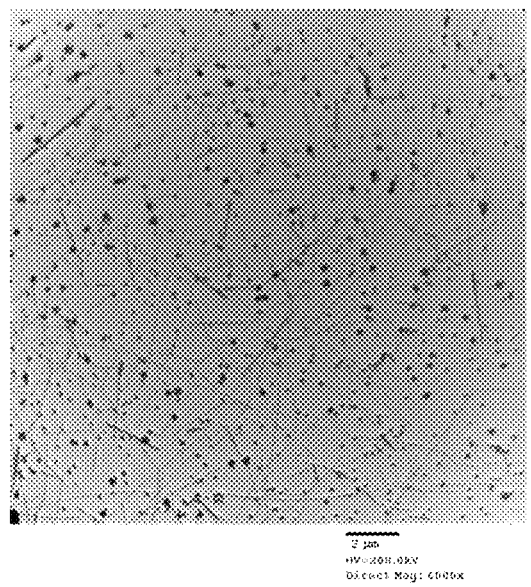
FIG. 3 is a diagram for low magnification transmission electron microscope (TEM) of the silver-chromium alloy nanowires with the silver to chromium molar ratio of 1:1, in which the silver-chromium alloy nanowires have a length of about (5±2) and a diameter of about (50±5) nm.
Figure 4:
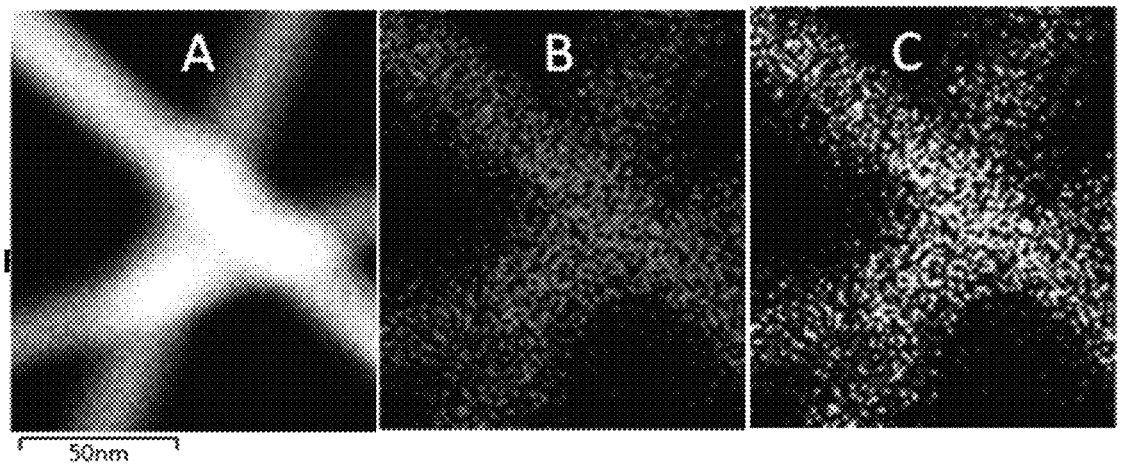
FIG. 4A is a diagram for high magnification transmission electron microscope (TEM) of the silver-chromium alloy nanowires.
FIG. 4B and FIG. 4C are diagrams of the element distribution of silver and chromium in the silver-chromium alloy nanowires as shown in FIG. 4A respectively, with the silver to chromium molar ratio of 1:1.
Figure 5:
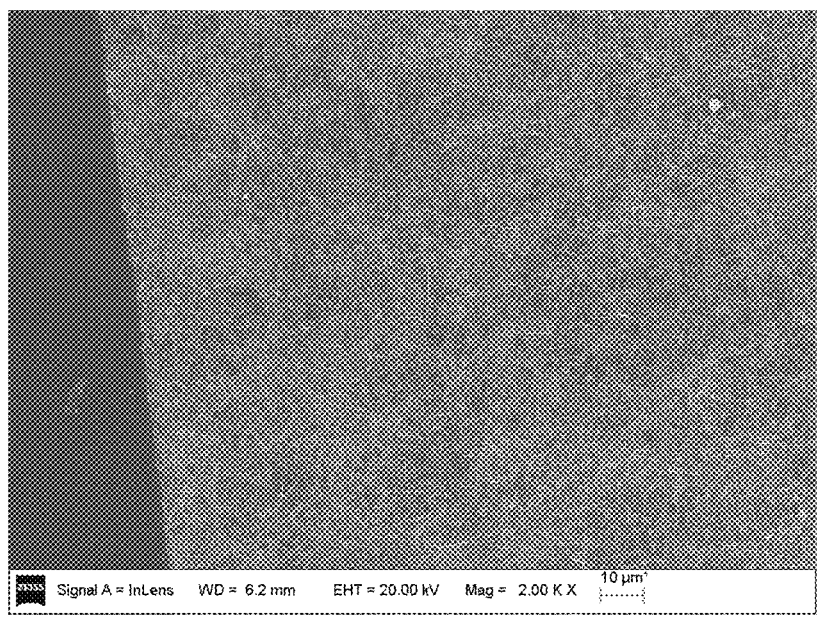
FIG. 5 is a diagram for low magnification scanning electron microscope (SEM) of the silver-chromium alloy nanowires with the silver to chromium molar ratio of 1:2, in which the silver-chromium alloy nanowires have a length of about (100±10) and a diameter of about (40±5) nm.
Figure 6:
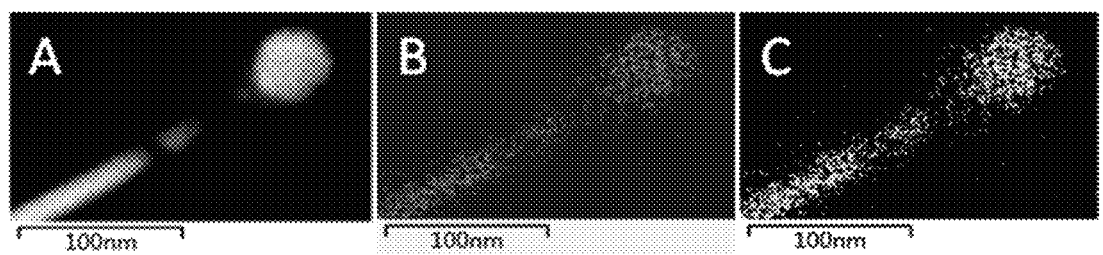
FIG. 6A is a diagram for high magnification transmission electron microscope (TEM) of the silver-chromium alloy nanowires.
FIG. 6B and FIG. 6C are diagrams of the element distribution of silver and chromium in the silver-chromium alloy nanowires as shown in FIG. 6A respectively, with the silver to chromium molar ratio of 1:2.
Figure 7:
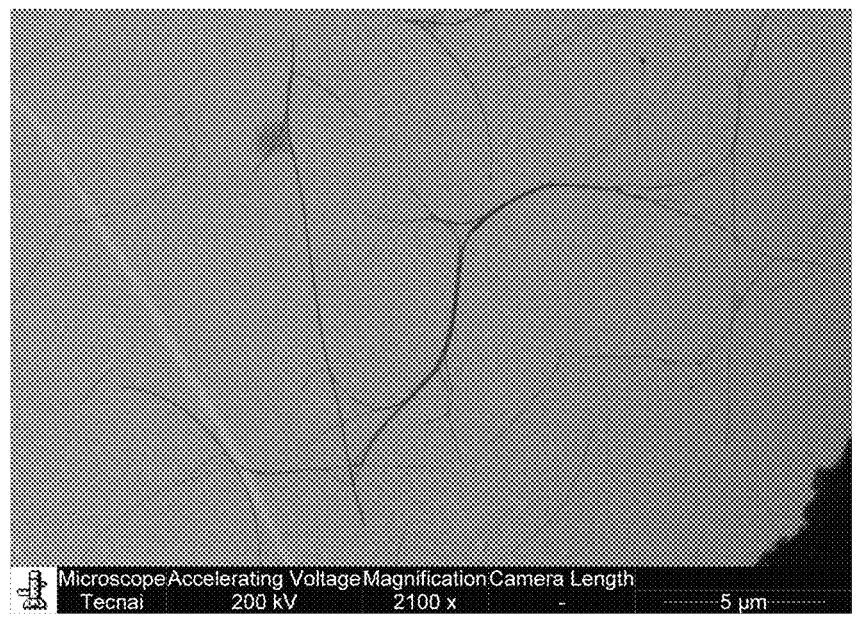
FIG. 7 is a diagram for low magnification transmission electron microscope (TEM) of the silver-chromium alloy nanowires with the silver to chromium molar ratio of 1:3, in which the silver-chromium alloy nanowires have a length of about (20±3) and a diameter of about (20±2) nm.
Figure 8:
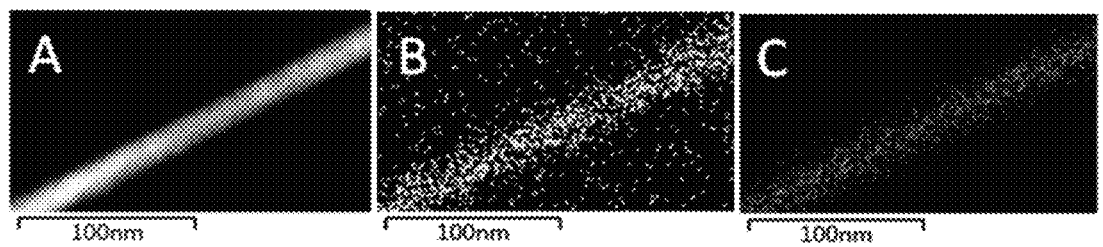
FIG. 8A is a diagram for high magnification transmission electron microscope (TEM) of the silver-chromium alloy nanowires.
FIG. 8B and FIG. 8C are diagrams of the element distribution of silver and chromium in the silver-chromium alloy nanowires as shown in FIG. 8A respectively, with the silver to chromium molar ratio of 1:3.
Figure 9:
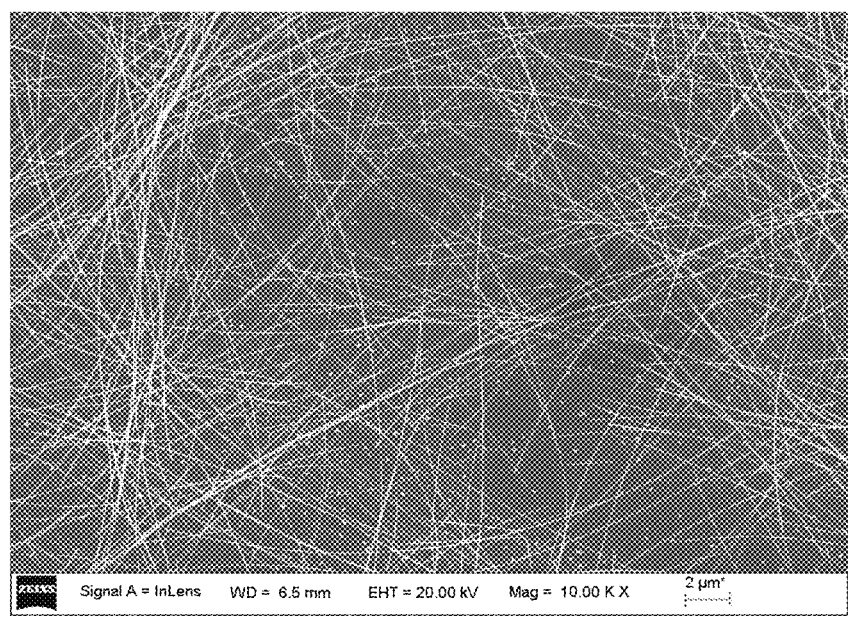
FIG. 9 is a diagram for high magnification scanning electron microscope (SEM) of the silver-chromium alloy nanowires as prepared in Example 1 according to the invention.

0.5 g of polyvinylpyrrolidone (PVP, protective agent), 4 ml of ethylene glycol (reductive agent), 0.33 g of silver acetate and 0.08 g of chromium nitrate nonahydrate were dissolved in 40 ml of deionized water, and the resultant mixture was stirred for 10 mins to fully dissolve the above materials therein, thereby to form a homogenous and transparent solution. Further, 20 µL of a 0.1 M NaCl solution was added to the above solution to form a homogenous solution after violent stirring. The resultant solution was transferred into a 50 ml closed reactor, and the closed reactor was placed in a 120° C. oven in which the reaction carried on for 10 hours. Thereafter, the closed reactor was taken out of the oven and naturally cooled in air. The cooled solution was transferred to a 100 mL flask, and then 10 mL of ethanol was added thereto to be mixed homogenously. The solution was introduced into a centrifugal tube to be centrifugal concentrated for 20 min with the rotary speed of 5000 rpm, and the resultant supernatant fluid was removed. The above operations were repeated once. Then, the concentrated suspension was dispersed with 3 mL of water. FIG. 9 is a SEM diagram of the silver-chromium alloy nanowires as prepared in the example. The experimental results are shown in Table 1. The silver-chromium alloy nanowires as prepared in Example 1 and conductive polymer were formulated to a conductive ink with the nanowire solid content of 1 mg/mL, and the resultant conductive ink was coated by the means of rolling coating to form a film. After the film was dried, the haze was measured to be 2.1%, the square resistivity to be (80±5) Ω/sq, and a light transmission rate to be 88%.

TABLE 1

|  | Silver acetate (mmoL) | Chromium nitrate (mmoL) | NaCl (mmoL) | Reaction temperature (° C.) | Length of nanowires (μm) | Diameter of nanowires (nm) |
|---|---|---|---|---|---|---|
| Example 1 | 2 | 0.2 | 0.002 | 160 | 100 ± 10 | 60 ± 5 |

Example 2

Figure 10:
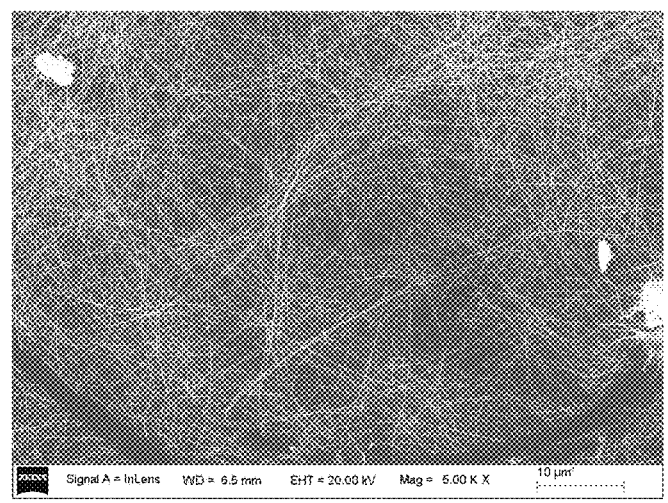
FIG. 10 is a diagram for low magnification scanning electron microscope (SEM) of the silver-chromium alloy nanowires as prepared in Example 2 according to the invention.

0.5 g of polyvinylpyrrolidone (PVP, protective agent), 4 ml of 1,2-propanediol (reductive agent), 0.304 g of silver oxalate and 0.08 g of chromium nitrate nonahydrate were dissolved in 45 ml of deionized water, and the resultant mixture was stirred for 10 mins to fully dissolve the above materials therein, thereby to form a homogenous and transparent solution. The resultant solution was transferred into a 50 ml closed reactor, and the closed reactor was placed in a 200° C. oven in which the reaction carried on for 2 hours. Thereafter, the closed reactor was taken out of the oven and naturally cooled in air. The cooled solution was transferred to a 100 mL flask, and then 10 mL of ethanol was added thereto to be mixed homogenously. The solution was introduced into a centrifugal tube to be centrifugation concentrated for 20 min with the rotary speed of 5000 rpm, and the resultant supernatant fluid was removed. The above operations were repeated once. Then, the concentrated suspension was dispersed with 3 mL of water. FIG. 10 is a SEM diagram of the silver-chromium alloy nanowires as prepared in the example. The experimental results are shown in Table 2. The silver-chromium alloy nanowires as prepared in Example 2 and conductive polymer were formulated to a conductive ink with the nanowire solid content of 1 mg/mL, and the resultant conductive ink was coated by the means of rolling coating to form a film. After the film was dried, the haze was measured to be 1.7%, the square resistivity to be (65±5) Ω/sq, and a light transmission rate to be 90%.

TABLE 2

|  | Silver oxalate (mmoL) | Chromium nitrate (mmoL) | Reaction temperature (° C.) | Length of nanowires (μm) | Diameter of nanowires (nm) |
|---|---|---|---|---|---|
| Example 2 | 1 | 0.2 | 160 | 80 ± 10 | 50 ± 5 |

Example 3

Figure 11:
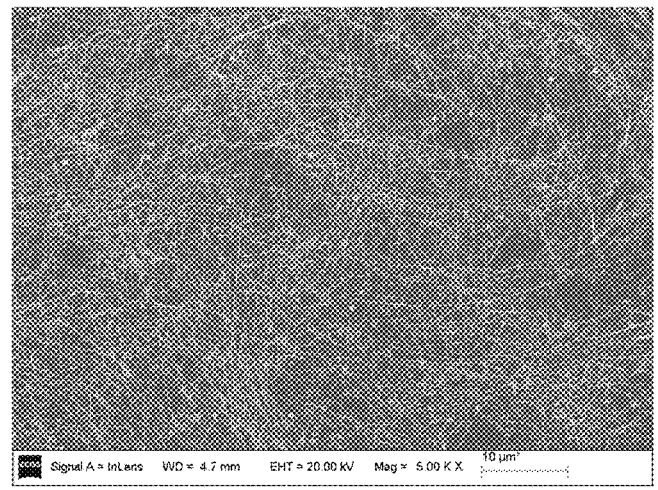
FIG. 11 is a diagram for low magnification scanning electron microscope (SEM) of the silver-chromium alloy nanowires as prepared in Example 3 according to the invention.

0.5 g of polyvinylpyrrolidone (PVP, protective agent), 4 ml of 1,4-butanediol (reductive agent), 0.33 g of silver acetate and 1.59 g of chromium chloride hexahydrate were dissolved in 45 ml of deionized water, and the resultant mixture was stirred for 10 mins to fully dissolve the above materials therein, thereby to form a homogenous and transparent solution. The resultant solution was transferred into a 50 ml closed reactor, and the closed reactor was placed in a 120° C. oven in which the reaction carried on for 10 hours. Thereafter, the closed reactor was taken out of the oven and naturally cooled in air. The cooled solution was transferred to a 100 mL flask, and then 10 mL of ethanol was added thereto to be mixed homogenously. The solution was introduced into a centrifugal tube to be centrifugation concentrated for 20 min with the rotary speed of 5000 rpm, and the resultant supernatant fluid was removed. The above operations were repeated once. Then, the concentrated suspension was dispersed with 3 mL of water. FIG. 11 is a SEM diagram of the silver-chromium alloy nanowires as prepared in the example. The experimental results are shown in Table 3. The silver-chromium alloy nanowires as prepared in Example 3 and conductive polymer were formulated to a conductive ink with the nanowire solid content of 1 mg/mL, and the resultant conductive ink was coated by the means of rolling coating to form a film. After the film was dried, the haze was measured to be 1.9%, the square resistivity to be (60±5) Ω/sq, and a light transmission rate to be 90%.

TABLE 3

|  | Silver acetate (mmoL) | Chromium chloride (mmoL) | Reaction temperature (° C.) | Length of nanowires (μm) | Diameter of nanowires (nm) |
|---|---|---|---|---|---|
| Example 3 | 2 | 6 | 160 | 60 ± 5 | 55 ± 5 |

Example 4

Figure 12:
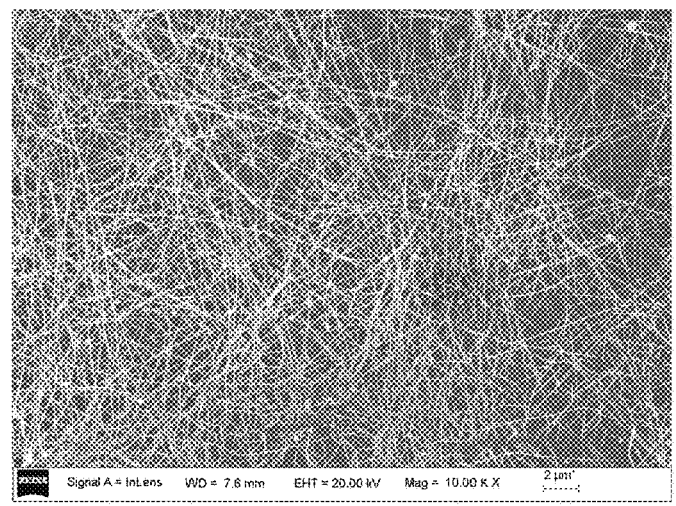
FIG. 12 is a diagram for high magnification scanning electron microscope (SEM) of the silver-chromium alloy nanowires as prepared in Example 4 according to the invention.

0.5 g of polyvinylpyrrolidone (PVP, protective agent), 4 ml of ethylene glycol (reductive agent), 0.33 g of silver acetate and 0.039 g of chromium sulfate were dissolved in 45 ml of deionized water, and the resultant mixture was stirred for 10 mins to fully dissolve the above materials therein, thereby to form a homogenous and transparent solution. The resultant solution was transferred into a 50 ml closed reactor, and the closed reactor was placed in a 200° C. oven in which the reaction carried on for 2 hours. Thereafter, the closed reactor was taken out of the oven and naturally cooled in air. The cooled solution was transferred to a 100 mL flask, and then 10 mL of ethanol was added thereto to be mixed homogenously. The solution was introduced into a centrifugal tube to be centrifugation concentrated for 20 min with the rotary speed of 5000 rpm, and the resultant supernatant fluid was removed. The above operations were repeated once. Then, the concentrated suspension was dispersed with 3 mL of water. FIG. 12 is a SEM diagram of the silver-chromium alloy nanowires as prepared in the example. The experimental results are shown in Table 4. The silver-chromium alloy nanowires as prepared in Example 4 and conductive polymer were formulated to a conductive ink with the nanowire solid content of 1 mg/mL, and the resultant conductive ink was coated by the means of rolling coating to form a film. After the film was dried, the haze was measured to be 1.8%, the square resistivity to be (70±5) Ω/sq, and a light transmission rate to be 90%.

TABLE 4

|  | Silver acetate (mmoL) | Chromium sulfate (mmoL) | Reaction temperature (° C.) | Length of nanowires (μm) | Diameter of nanowires (nm) |
|---|---|---|---|---|---|
| Example 4 | 2 | 0.1 | 160 | 40 ± 5 | 55 ± 5 |

Example 5

Figure 13:
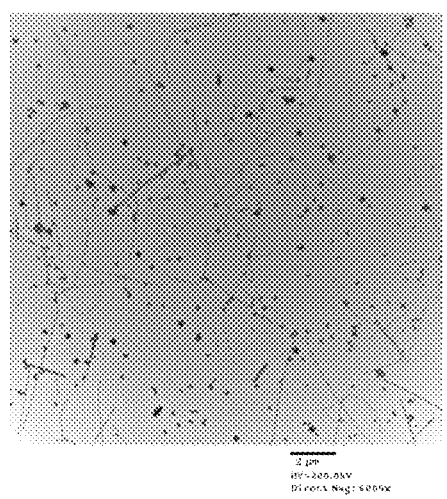
FIG. 13 is a diagram for low magnification transmission electron microscope (TEM) of the silver-chromium alloy nanowires as prepared in Example 5 according to the invention.

0.5 g of polyvinylpyrrolidone (PVP, protective agent), 0.304 g of silver oxalate and 0.039 g of chromium sulfate were dissolved in 80 ml of ethylene glycol (reductive agent), and the resultant mixture was stirred for 10 mins to fully dissolve the above materials therein, thereby to form a homogenous and transparent solution. Further, 20 μL of a 0.1 M NaCl solution was added to the above solution to form a homogenous solution after violent stirring. The resultant solution was transferred into a 100 ml conical flask, and the conical flask was placed in a 120° C. oven in which the reaction carried on for 10 hours. Thereafter, the conical flask was taken out of the oven and naturally cooled in air. The cooled solution was transferred to a 200 mL flask, and then 20 mL of ethanol was added thereto to be mixed homogenously. The solution was introduced into a centrifugal tube to be centrifugation concentrated for 20 min with the rotary speed of 5000 rpm, and the resultant supernatant fluid was removed. The above operations were repeated once. Then, the concentrated suspension was dispersed with 10 mL of water. FIG. 13 is a SEM diagram of the silver-chromium alloy nanowires as prepared in the example. The experimental results are shown in Table 5.

TABLE 5

|  | Silver oxalate (mmoL) | Chromium sulfate (mmoL) | Reaction temperature (° C.) | Length of nanowires (μm) | Diameter of nanowires (nm) |
| --- | --- | --- | --- | --- | --- |
| Example 5 | 1 | 0.1 | 120 | 5 ± 2 | 40 ± 5 |

Example 6

Figure 14:
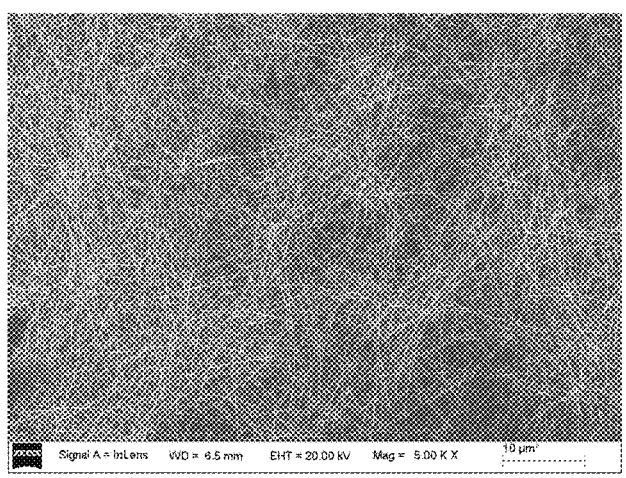
FIG. 14 is a diagram for low magnification scanning electron microscope (SEM) of the silver-chromium alloy nanowires as prepared in Example 6 according to the invention.
Figure 15:
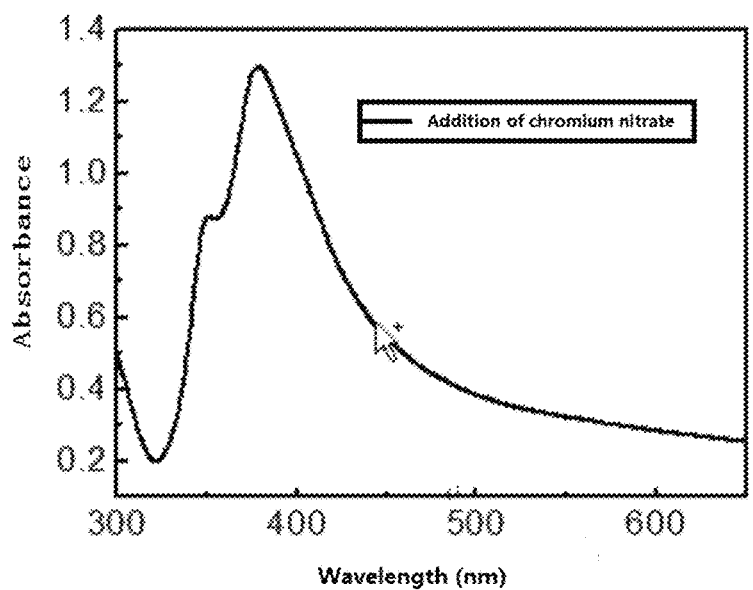
FIG. 15 is a diagram for UV absorption of the silver-chromium alloy nanowires as prepared in Example 6 according to the invention.

2 g of polyvinylpyrrolidone (PVP, protective agent), 1.36 g of silver nitrate and 0.032 g of chromium nitrate nonahydrate were dissolved in 160 ml of 1,2-propanediol (reductive agent), and the resultant mixture was stirred for 10 mins to fully dissolve the above materials therein, thereby to form a homogenous and transparent solution. Further, 100 μL of a 0.1 M Na$_2$SiO$_3$ solution was added to the above solution to form a homogenous solution after violent stirring. The resultant solution was transferred into a 200 ml closed reactor, and the closed reactor was placed in a 200° C. oven in which the reaction carried on for 6 hours. Thereafter, the closed reactor was taken out of the oven and naturally cooled in air. The cooled solution was transferred to a 500 mL flask, and then 100 mL of ethanol was added thereto to be mixed homogenously. The solution was introduced into a centrifugal tube to be centrifugation concentrated for 20 min with the rotary speed of 5000 rpm, and the resultant supernatant fluid was removed. The above operations were repeated once. Then, the concentrated suspension was dispersed with 30 mL of water. FIG. 14 is a SEM diagram of the silver-chromium alloy nanowires as prepared in the example. FIG. 15 is the UV absorption diagram of the nanowires as prepared in the example. The experimental results are shown in Table 6. The silver-chromium alloy nanowires as prepared in Example 6 and conductive polymer were formulated to a conductive ink with the nanowire solid content of 1 mg/mL, and the resultant conductive ink was coated by the means of rolling coating to form a film. After the film was dried, the haze was measured to be 1.7%, the square resistivity to be (60±5) Ω/sq, and a light transmission rate to be 85%.

TABLE 6

|  | Silver nitrate (mmoL) | Chromium nitrate (mmoL) | Na$_2$SiO$_3$ (mmoL) | Reaction temperature (° C.) | Length of nanowires (μm) | Diameter of nanowires (nm) |
| --- | --- | --- | --- | --- | --- | --- |
| Example 6 | 8 | 0.08 | 0.01 | 200 | 100 ± 10 | 50 ± 5 |

Example 7

Figure 16:
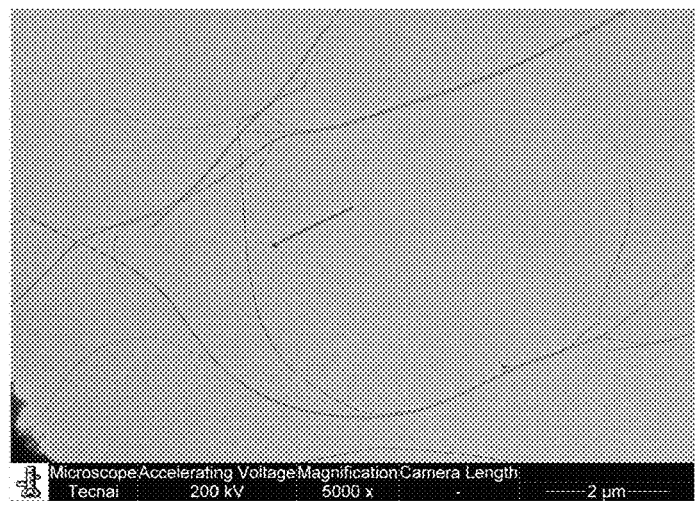
FIG. 16 is a diagram for low magnification transmission electron microscope (TEM) of the silver-chromium alloy nanowires as prepared in Example 7 according to the invention.
Figure 17:
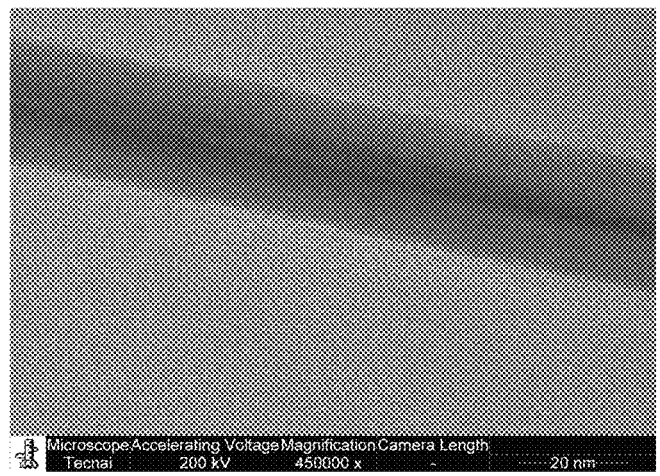
FIG. 17 is a diagram for high magnification transmission electron microscope (TEM) of the silver-chromium alloy nanowires as prepared in Example 7 according to the invention.

2 g of polyvinylpyrrolidone (PVP, protective agent), 1.36 g of silver nitrate and 6.4 g of chromium chloride hexahydrate were dissolved in 160 ml of 1,4-butanediol (reductive agent), and the resultant mixture was stirred for 10 mins to fully dissolve the above materials therein, thereby to form a homogenous and transparent solution. The resultant solution was transferred into a 200 ml conical flask, and the conical flask was placed in a 200° C. oven in which the reaction carried on for 2 hours. Thereafter, the conical flask was taken out of the oven and naturally cooled in air. The cooled solution was transferred to a 500 mL flask, and then 100 mL of ethanol was added thereto to be mixed homogenously. The solution was introduced into a centrifugal tube to be centrifugation concentrated for 20 min with the rotary speed of 5000 rpm, and the resultant supernatant fluid was removed. The above operations were repeated once. Then, the concentrated suspension was dispersed with 30 mL of water. FIG. 16 and FIG. 17 are the SEM and TEM diagrams of the silver-chromium alloy nanowires as prepared in the example respectively. The experimental results are shown in Table 7. The silver-chromium alloy nanowires as prepared in Example 7 and conductive polymer were formulated to a conductive ink with the nanowire solid content of 1 mg/mL, and the resultant conductive ink was coated by the means of rolling coating to form a film. After the film was dried, the haze was measured to be 1.0%, the square resistivity to be (60±5) Ω/sq, and a light transmission rate to be 90%.

TABLE 7

|  | Silver nitrate (mmoL) | Chromium chloride (mmoL) | Reaction temperature (° C.) | Length of nanowires (μm) | Diameter of nanowires (nm) |
| --- | --- | --- | --- | --- | --- |
| Example 7 | 8 | 24 | 200 | 20 ± 3 | 20 ± 2 |

Example 8

Figure 18:
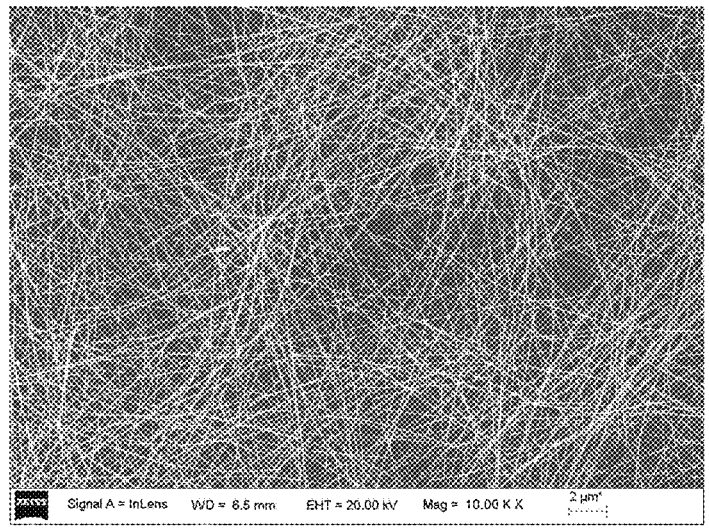
FIG. 18 is a diagram for high magnification scanning electron microscope (SEM) of the silver-chromium alloy nanowires as prepared in Example 8 according to the invention.

2 g of polyvinylpyrrolidone (PVP, protectve agent), 1.36 g of AgNO$_3$ and 4.7 g of chromium sulfate were dissolved in 160 ml of hexanediol (reductive agent), and the resultant mixture was stirred for 10 mins to fully dissolve the above materials therein, thereby to form a homogenous and transparent solution. The resultant solution was transferred into a 200 ml conical flask, and the conical flask was placed in a 200° C. oven in which the reaction carried on for 4 hours. Thereafter, the conical flask was taken out of the oven and naturally cooled in air. The cooled solution was transferred to a 500 mL flask, and then 100 mL of ethanol was added thereto to be mixed homogenously. The solution was introduced into a centrifugal tube to be centrifugation concentrated for 20 min with the rotary speed of 5000 rpm, and the resultant supernatant fluid was removed. The above operations were repeated once. Then, the concentrated suspension was dispersed with 30 mL of water. FIG. 18 is a SEM diagram of the silver-chromium alloy nanowires as prepared in the example. The experimental results are shown in Table 8. The silver-chromium alloy nanowires as prepared in Example 8 and conductive polymer were formulated to a conductive ink with the nanowire solid content of 1 mg/mL, and the resultant conductive ink was coated by the means of rolling coating to form a film. After the film was dried, the haze was measured to be 1.3%, the square resistivity to be (65±5) Ω/sq, and a light transmission rate to be 90%.

TABLE 8

| | Silver nitrate (mmoL) | Chromium sulfate (mmoL) | Reaction temperature (° C.) | Length of nanowires (μm) | Diameter of nanowires (nm) |
|---|---|---|---|---|---|
| Example 8 | 8 | 12 | 200 | 35 ± 5 | 25 ± 2 |

Example 9

Figure 19:
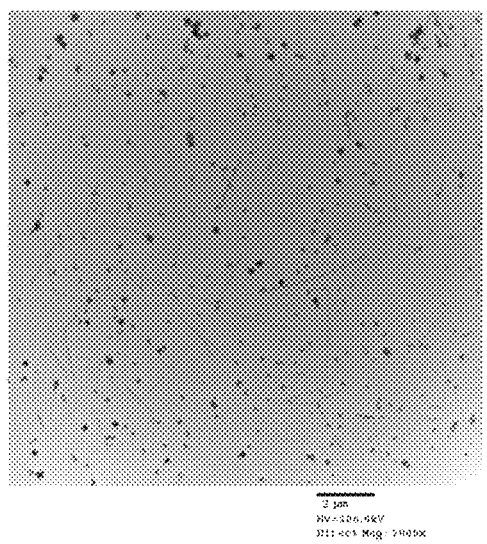
FIG. 19 is a diagram for low magnification transmission electron microscope (TEM) of the silver-chromium alloy nanowires as prepared in Example 9 according to the invention.

2 g of polyvinylpyrrolidone (PVP, protective agent), 4.21 g of formamide (reductive agent), 1.34 g of silver acetate and 6.4 g of chromium chloride hexahydrate were dissolved in 180 ml of deionized water, and the resultant mixture was stirred for 10 mins to fully dissolve the above materials therein, thereby to form a homogenous and transparent solution. Further, 80 μL of a 0.1 M NaBr solution was added to the above solution to form a homogenous solution after violent stirring. The resultant solution was transferred into a 200 ml closed reactor, and the closed reactor was placed in a 200° C. oven in which the reaction carried on for 2 hours. Thereafter, the closed reactor was taken out of the oven and naturally cooled in air. The cooled solution was transferred to a 500 mL flask, and then 100 mL of ethanol was added thereto to be mixed homogenously. The solution was introduced into a centrifugal tube to be centrifugation concentrated for 20 min with the rotary speed of 5000 rpm, and the resultant supernatant fluid was removed. The above operations were repeated once. Then, the concentrated suspension was dispersed with 10 mL of water. FIG. 19 is a SEM diagram of the silver-chromium alloy nanowires as prepared in the example. The experimental results are shown in Table 9. The silver-chromium alloy nanowires as prepared in Example 9 and conductive polymer were formulated to a conductive ink with the nanowire solid content of 1 mg/mL, and the resultant conductive ink was coated by the means of rolling coating to form a film. After the film was dried, the haze was measured to be 1.5%, the square resistivity to be (60±5) Ω/sq, and a light transmission rate to be 88%.

TABLE 9

| | Silver acetate (mmoL) | Chromium chloride (mmoL) | NaBr (mmoL) | Reaction temperature (° C.) | Length of nanowires (μm) | Diameter of nanowires (nm) |
|---|---|---|---|---|---|---|
| Example 9 | 8 | 24 | 0.008 | 120 | 5 ± 2 | 40 ± 5 |

Example 10

Figure 20:
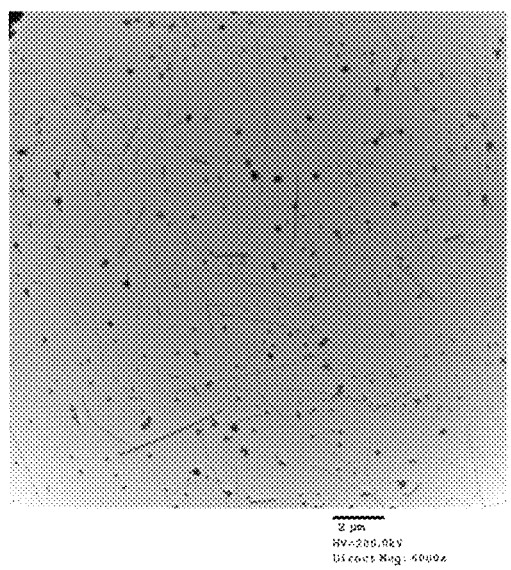
FIG. 20 is a diagram for low magnification transmission electron microscope (TEM) of the silver-chromium alloy nanowires as prepared in Example 10 according to the invention.

0.5 g of polyvinylpyrrolidone (PVP, protective agent), 9.9 g of formamide (reductive agent), 1.34 g of silver acetate and 1.18 g of chromium sulfate were dissolved in 45 ml of deionized water, and the resultant mixture was stirred for 10 mins to fully dissolve the above materials therein, thereby to form a homogenous and transparent solution. Further, 1000 μL of a 0.1 M NaSCN solution was added to the above solution to form a homogenous solution after violent stirring. The resultant solution was transferred into a 50 ml closed reactor, and the closed reactor was placed in a 120° C. oven in which the reaction carried on for 10 hours. Thereafter, the closed reactor was taken out of the oven and naturally cooled in air. The cooled solution was transferred to a 500 mL flask, and then 10 mL of ethanol was added thereto to be mixed homogenously. The solution was introduced into a centrifugal tube to be centrifugation concentrated for 20 min with the rotary speed of 5000 rpm, and the resultant supernatant fluid was removed. The above operations were repeated once. Then, the concentrated suspension was dispersed with 3 mL of water. FIG. 20 is a TEM diagram of the silver-chromium alloy nanowires as prepared in the example. The experimental results are shown in Table 10.

TABLE 10

| | Silver acetate (mmoL) | Chromium sulfate (mmoL) | NaSCN (mmoL) | Reaction temperature (° C.) | Length of nanowires (μm) | Diameter of nanowires (nm) |
|---|---|---|---|---|---|---|
| Example 10 | 2 | 3 | 0.1 | 160 | 5 ± 2 | 40 ± 5 |

Example 11

Figure 21:
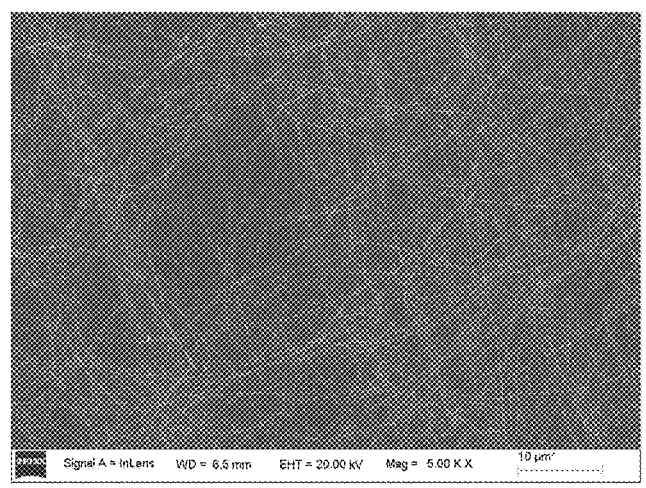
FIG. 21 is a diagram for low magnification scanning electron microscope (SEM) of the silver-chromium alloy nanowires as prepared in Example 11 according to the invention.

0.5 g of polyvinylpyrrolidone (PVP, protective agent), 3.483 g of glucose (reductive agent), 0.303 g of silver oxalate and 2.4 g of chromium nitrate nonahydrate were dissolved in 45 ml of deionized water, and the resultant mixture was stirred for 10 mins to fully dissolve the above materials therein, thereby to form a homogenous and transparent solution. Further, 20 μL of a 0.1 M NaCl solution was added to the above solution to form a homogenous solution after violent stirring. The resultant solution was transferred into a 50 ml closed reactor, and the closed reactor was placed in a 120° C. oven in which the reaction carried on for 10 hours. Thereafter, the closed reactor was taken out of the oven and naturally cooled in air. The cooled solution was transferred to a 100 mL flask, and then 10 mL of ethanol was added thereto to be mixed homogenously. The solution was introduced into a centrifugal tube to be centrifugation concentrated for 20 min with the rotary speed of 5000 rpm, and the resultant supernatant fluid was removed. The above operations were repeated once. Then, the concentrated suspension was dispersed with 3 mL of water. FIG. 21 is a SEM diagram of the silver-chromium alloy nanowires as prepared in the example. The experimental results are shown in Table 10.

TABLE 11

| | Silver oxalate (mmoL) | Chromium nitrate (mmoL) | NaCl (mmoL) | Reaction temperature (° C.) | Length of nanowires (μm) | Diameter of nanowires (nm) |
|---|---|---|---|---|---|---|
| Example 11 | 1 | 6 | 0.002 | 160 | 50 ± 5 | 40 ± 5 |

Example 12

0.5 g of polyvinylpyrrolidone (PVP, protective agent), 10.45 g of glucose (reductive agent), 0.303 g of silver oxalate and 1.17 g of chromium sulfate were dissolved in 45 ml of deionized water, and the resultant mixture was stirred for 10 mins to fully dissolve the above materials therein, thereby to form a homogenous and transparent solution. Further, 20 μL of a 0.1 M NaCl solution was added to the above solution to form a homogenous solution after violent stirring. The resultant solution was transferred into a 50 ml closed reactor, and the closed reactor was placed in a 200° C. oven in which the reaction carried on for 2 hours. Thereafter, the closed reactor was taken out of the oven and naturally cooled in air. The cooled solution was transferred to a 100 mL flask, and then 10 mL of ethanol was added thereto to be mixed homogenously. The solution was introduced into a centrifugal tube to be centrifugation concentrated for 20 min with the rotary speed of 5000 rpm, and the resultant supernatant fluid was removed. The above operations were repeated once.

Figure 22:
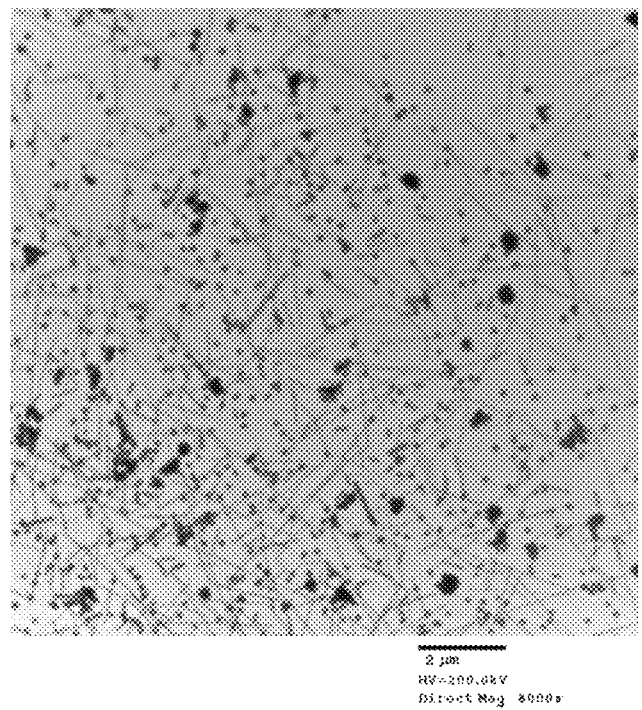
FIG. 22 is a diagram for low magnification transmission electron microscope (TEM) of the silver-chromium alloy nanowires as prepared in Example 12 according to the invention.

Then, the concentrated suspension was dispersed with 3 mL of water. FIG. 22 is a TEM diagram of the silver-chromium alloy nanowires as prepared in the example. The experimental results are shown in Table 12.

TABLE 12

| | Silver oxalate (mmoL) | Chromium sulfate (mmoL) | NaCl (mmoL) | Reaction temperature (° C.) | Length of nanowires (μm) | Diameter of nanowires (nm) |
|---|---|---|---|---|---|---|
| Example 12 | 1 | 3 | 0.002 | 160 | 6 ± 2 | 35 ± 3 |

Example 13

Figure 23:
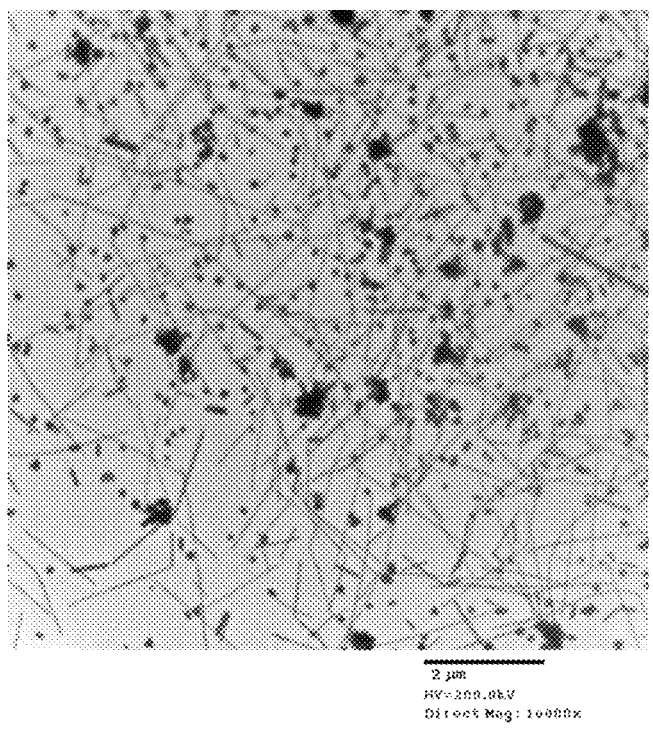
FIG. 23 is a diagram for low magnification transmission electron microscope (TEM) of the silver-chromium alloy nanowires as prepared in Example 13 according to the invention.

2 g of polyvinylpyrrolidone (PVP, protective agent), 3.424 g of hexamethylene tetraamine (reductive agent), 1.36 g of AgNO₃ and 6.4 g of chromium chloride hexahydrate were dissolved in 200 ml of deionized water, and the resultant mixture was stirred for 10 mins to fully dissolve the above materials therein, thereby to form a homogenous and transparent solution. The resultant solution was transferred into a 200 ml closed reactor, and the closed reactor was placed in a 120° C. oven in which the reaction carried on for 10 hours. Thereafter, the closed reactor was taken out of the oven and naturally cooled in air. The cooled solution was transferred to a 100 mL flask, and then 10 mL of ethanol was added thereto to be mixed homogenously. The solution was introduced into a centrifugal tube to be centrifugation concentrated for 20 min with the rotary speed of 5000 rpm, and the resultant supernatant fluid was removed. The above operations were repeated once. Then, the concentrated suspension was dispersed with 3 mL of water. FIG. 23 is a TEM diagram of the silver-chromium alloy nanowires as prepared in the example. The experimental results are shown in Table 13.

TABLE 13

| | Silver nitrate (mmoL) | Chromium chloride (mmoL) | Reaction temperature (° C.) | Length of nanowires (μm) | Diameter of nanowires (nm) |
|---|---|---|---|---|---|
| Example 13 | 8 | 24 | 160 | 8 ± 2 | 40 ± 5 |

Example 14

Figure 24:
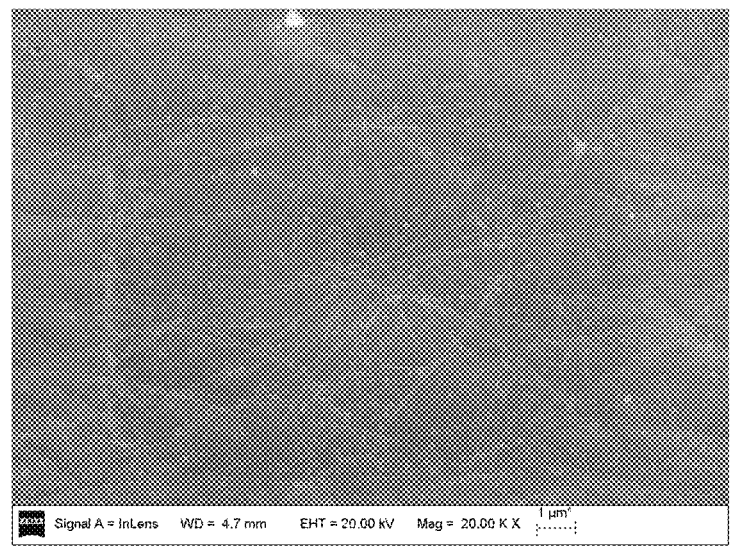
FIG. 24 is a diagram for high magnification scanning electron microscope (SEM) of the silver-chromium alloy nanowires as prepared in Example 14 according to the invention.

2 g of polyvinylpyrrolidone (PVP, protective agent), 1.36 g of AgNO₃ and 6.4 g of chromium nitrate nonahydrate were dissolved in 60 ml of 1,2-propanediol (reductive agent), and the resultant mixture was stirred for 10 mins to fully dissolve the above materials therein, thereby to form a homogenous and transparent solution. Further, 100 μL of a 0.1 M Na₂SiO₃ solution was added to the above solution to form a homogenous solution after violent stirring. The resultant solution was transferred into a 200 ml conical flask, and the conical flask was placed in a 120° C. oven in which the reaction carried on for 0.5 hours. Then, 100 ml of 1,2-propanediol solution in which 8 mmol of silver nitrate and 16 mmol of chromium nitrate were dissolved was slowly added to the above solution. The whole adding propcess carried on for 20 min, and after all the solution were added, the reaction further continued for 2 hours. Thereafter, the conical flask was taken out of the oven and naturally cooled in air. The cooled solution was transferred to a 100 mL flask, and then 10 mL of ethanol was added thereto to be mixed homogenously. The solution was introduced into a centrifugal tube to be centrifugation concentrated for 20 min with the rotary speed of 5000 rpm, and the resultant supernatant fluid was removed. The above operations were repeated once. Then, the concentrated suspension was dispersed with 3 mL of water. FIG. 24 is a SEM diagram of the silver-chromium alloy nanowires as prepared in the example. The experimental results are shown in Table 14.

TABLE 14

| | Silver nitrate (mmoL) | Chromium nitrate (mmoL) | Na$_2$SiO$_3$ (mmoL) | Reaction temperature (° C.) | Length of nanowires (μm) | Diameter of nanowires (nm) |
|---|---|---|---|---|---|---|
| Example 14 | 16 | 32 | 0.01 | 160 | 30-40 | 35 ± 5 |

As seen from the experiential results of Examples 1-14, the diameter and length of the silver-chromium alloy nanowires as prepared by the method according to the invention are controllable.

Figure 25:
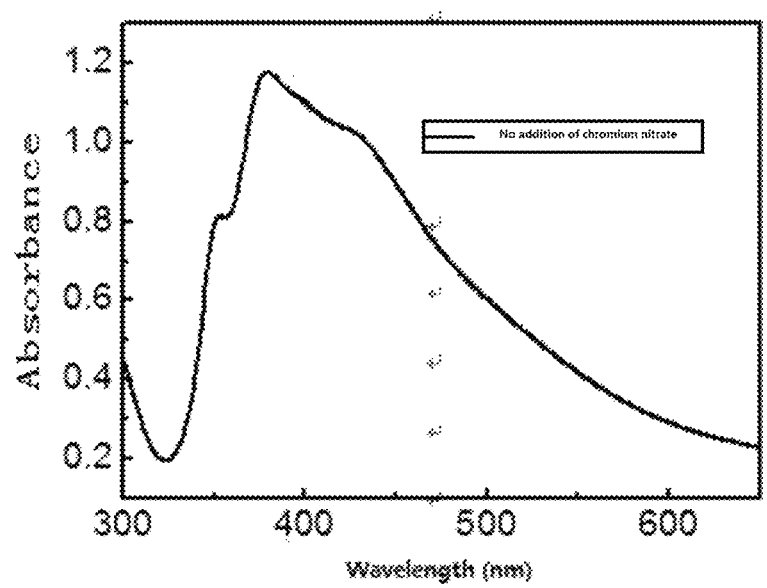
FIG. 25 is a diagram for UV absorption of the silver nanowires as prepared in the comparative example.

COMPARATIVE EXAMPLE 2 g of polyvinylpyrrolidone (PVP, protective agent), and 1.36 g of AgNO$_3$ were dissolved in 160 ml of 1,2-propanediol (reductive agent), and the resultant mixture was stirred for 10 mins to fully dissolve the above materials therein, thereby to form a homogenous and transparent solution. Further, 100 μL of a 0.1 M Na$_2$SiO$_3$ solution was added to the above solution to form a homogenous solution after violent stirring. The resultant solution was transferred into a 200 ml closed reactor, and the closed reactor was placed in a 200° C. oven in which the reaction carried on for 6 hours. Thereafter, the closed reactor was taken out of the oven and naturally cooled in air. The cooled solution was transferred to a 500 mL flask, and then 100 mL of ethanol was added thereto to be mixed homogenously. The solution was introduced into a centrifugal tube to be centrifugation concentrated for 20 min with the rotary speed of 5000 rpm, and the resultant supernatant fluid was removed. The above operations were repeated once. Then, the concentrated suspension was dispersed with 30 mL of water. FIG. 25 is the UV absorption diagram of the silver-chromium alloy nanowires as prepared in the example.

As seen from the comparisons between FIG. 15 and FIG. 25, in the wavelength range of visible light of 400 to 600 nm, the UV absorption rate of the silver-chromium alloy nanowires as papered in the invention is obviously lower than the UV absorption rate of the silver nanowires as prepared in the comparative example for the reason that the UV absorption in the wavelength range is primarily caused by particle product. Thus, it can be proved that in the preparing method according to the invention, the addition of a chromium source can result in that the particle content in the prepared product becomes lower and the proportion of the linear product is increased.

What is claimed is:

1. A silver-chromium alloy nanowire, wherein the silver-chromium alloy nanowire has a diameter of 18 to 50 nm, and a length of 5 to 100 μm, wherein a molar ratio of silver to chromium is 1:1-3.

2. A method for preparing a silver-chromium alloy nanowire, wherein the silver-chromium alloy nanowire has a diameter of 18 to 50 nm, and a length of 5 to 100 μm, a molar ratio of silver to chromium is 1:1-3, the method comprises the following steps:
   a. preparing a reaction solution: formulating a silver source, a chromium source, polyvinylpyrrolidone and a reductive agent into a reaction solution, or adding the silver source, chromium source, polyvinylpyrrolidone and reductive agent into deionized water to formulate the reaction solution, wherein a molar ratio of silver ions in the silver source to chromium ions in the chromium source is 1:0.01-3; adding the reaction solution into a reaction vessel;
   b. performing a reductive reaction: performing a reductive reaction by maintaining the reaction vessel at a temperature of 120° C. to 200° C. for 2 to 10 hours, to obtain a silver-chromium alloy nanowire suspension.

3. The method according to claim 2, wherein after the step b, the method further comprises the following step c: centrifugation concentrating the silver-chromium alloy nanowire suspension to obtain a concentrated silver-chromium alloy nanowire suspension.

4. The method according to claim 2, wherein the silver source is selected from the group consisting of silver nitrate, silver oxalate and silver acetate; wherein the chromium source is selected from the group consisting of chromium sulfate, chromium chloride and chromium nitrate; wherein the reductive agent is selected from the group consisting of polyol, formamide, hexamethylenetetraamine and glucose; wherein the polyol is selected from the group consisting of ethylene glycol, 1,2-propanediol, 1,4-butanediol and hexanediol.

5. The method according to claim 2, wherein the reductive reaction is performed under an autogenous pressure in a closed reaction vessel or the reductive reaction is performed under a normal pressure in an opening reaction vessel.

6. The method according to claim 5, wherein the reaction solution is added into the reaction vessel at once or a portion of the reaction solution is firstly added into the opening reaction vessel, and then the left portion of the reaction solution is added into the opening reaction vessel in portions during the reaction.

7. The method according to claim 2, wherein the reaction solution further comprises a nucleation controlling agent, wherein the nucleation controlling agent is selected from the group consisting of alkali metal halides, alkaline earth metal halides, alkali metal silicates, alkaline earth metal silicates, alkali metal sulfates, alkaline earth metal sulfates, alkali metal thiocyanates, alkaline earth metal thiocyanates, alkali metal oxalates, alkaline earth metal oxalates, alkali metal sulfides and alkaline earth metal sulfides.

8. The method according to claim 4, wherein when the reductive agent is polyol, a volume ratio of the polyol to the deionized water is 1:0-10;
   wherein when the reductive agent is formamide or glucose, a molar ratio of the silver ions in the silver source to the reductive agent is 1:2.7-20, and a molar ratio of the chromium ions in the chromium source to the reductive agent is 1:3-30;
   wherein when the reductive agent is hexamethylenetetraamine, a molar ratio of the silver ions in the silver source to the reductive agent is 1:0.7-5, and a molar ratio of the chromium ions in the chromium source to the reductive agent is 1:0.8-8.

9. The method according to claim 2, wherein a diameter of the silver-chromium alloy nanowire is reduced by reducing a molar ratio of Ag/Cr.

* * * * *